United States Patent
Bijlsma

(10) Patent No.: US 8,756,657 B2
(45) Date of Patent: Jun. 17, 2014

(54) MOBILE OR USER DEVICE AUTHENTICATION AND TRACKING

(75) Inventor: Lolke Bijlsma, San Jose, CA (US)

(73) Assignee: Ebay Inc., San Jose, CA (US)

( * ) Notice: Subject to any disclaimer, the term of this patent is extended or adjusted under 35 U.S.C. 154(b) by 793 days.

(21) Appl. No.: 12/569,711

(22) Filed: Sep. 29, 2009

(65) Prior Publication Data

US 2011/0078762 A1 Mar. 31, 2011

(51) Int. Cl.
*G06F 21/00* (2013.01)
(52) U.S. Cl.
USPC ............ 726/3; 455/421; 705/30; 705/37; 705/39; 709/223
(58) Field of Classification Search
USPC .......... 726/3, 5; 709/223; 705/30; 713/176
See application file for complete search history.

(56) References Cited

U.S. PATENT DOCUMENTS

| | | | |
|---|---|---|---|
| 8,037,511 B1 * | 10/2011 | Lundy et al. .................. | 726/3 |
| 2008/0220760 A1 | 9/2008 | Ullah | |
| 2009/0119190 A1 * | 5/2009 | Realini ......................... | 705/30 |
| 2009/0212104 A1 * | 8/2009 | Smith et al. .................. | 235/379 |

OTHER PUBLICATIONS

"A Family of Dunces: Trivial RFID Identification and Authentication Protocols"; Gene Tsudik; Privacy Enhancing Technologies, 2007; Computer Science Department University of California, Irvine.*
"Mobile privacy in wireless networks—revisited"; C Tang et al; 8 pages; Wireless Communications, IEEE Transactions on, 2008.*

* cited by examiner

*Primary Examiner* — Jason Lee
(74) *Attorney, Agent, or Firm* — Haynes and Boone, LLP

(57) ABSTRACT

A system and method, according to one or more embodiments, includes a server computing device configured to communicate with a network-based device via a network; a visitor identification, in which the system generates the visitor identification and the visitor identification corresponds to a piece of information that is unique to the network-based device; a mapping for which the system adds the generated visitor identification to the mapping so that the visitor identification uniquely identifies the network-based device from all other network-based devices in communication with the server computing device; and a database in which the system tracks the visitor identification among a plurality of visitor identifications in the database.

19 Claims, 2 Drawing Sheets

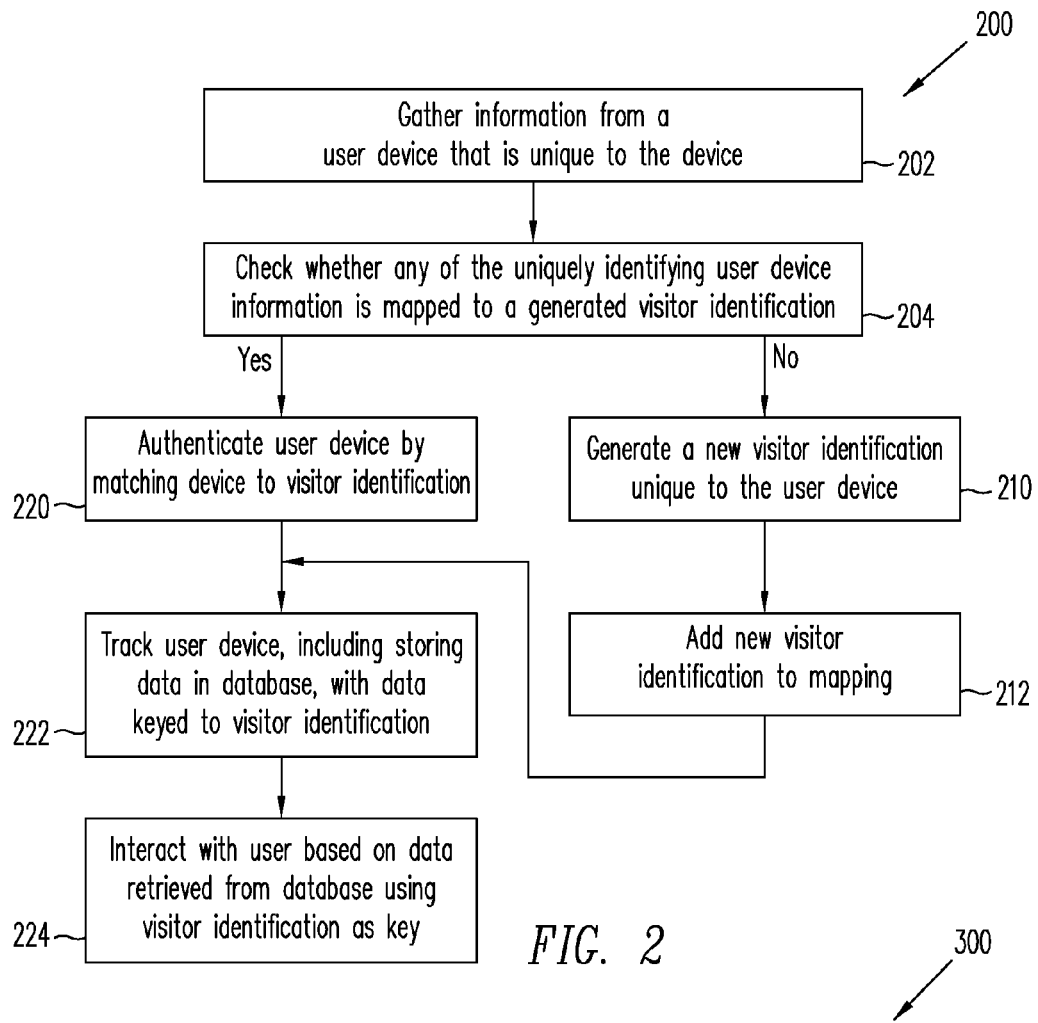

MOBILE OR USER DEVICE AUTHENTICATION AND TRACKING

BACKGROUND

1. Technical Field

Embodiments of the present disclosure generally relate to communications security and, more particularly, to providing identity authentication and tracking for a mobile device or other user device.

2. Related Art

A mobile or user device, such as a cell phone, typically contains one or more pieces of information that are unique to that particular device and so can be used as an identification. For example, a mobile phone may contain a SIM (subscriber identity module) identification, IMEI (international mobile equipment identification) number, IP (internet protocol) identification, or the phone number itself.

The phone number of the mobile device is usually associated with a particular subscriber, but is generally assigned to no more than one phone at a time, and so can usually be used to identify the subscriber and the device, although the phone number itself may occasionally be moved from one device to another, e.g., when the subscriber gets a new phone.

The SIM card allows users to change phones, for example, by simply removing the SIM card from one mobile phone and inserting it into another mobile phone. The subscriber identity module on a removable SIM card may securely store its unique serial number, the service-subscriber key known as an International Mobile Subscriber Identity (IMSI), which may be used to identify a subscriber on mobile telephony devices such as computers and mobile phones. The IMSI is a unique number associated with all GSM (Global System for Mobile) and UMTS (Universal Mobile Telecommunications System) network mobile phone users. An IMSI is usually 15 digits long. It is stored in the SIM inside the phone and is sent by the phone to the network. It is also used to acquire other details of the mobile in the Home Location Register (HLR) or as locally copied in the Visitor Location Register. An IP Multimedia Services Identity Module (ISIM) is an application running on a UICC (universal integrated circuit) smart card in a third-generation (3G) mobile telephone in the IP Multimedia Subsystem (IMS). It contains parameters for identifying and authenticating the user to the IMS. The ISIM application can co-exist with SIM and USIM (Universal Subscriber Identity Module) on the same UICC, making it possible to use the same smartcard in both GSM networks and earlier releases of UMTS. The ISIM usually contains a private user identity and one or more public user identities.

The International Mobile Equipment Identity (IMEI) is a number unique to every GSM mobile phone, as well as some satellite phones. The IMEI typically has 15 digits and may be electronically stored or programmed into the phone. It is usually found printed inside the battery compartment of the phone. It may also be displayed on the screen of the phone by entering *#06# into the keypad. Generally, the IMEI is only used to identify the mobile device and has no permanent or semi-permanent relation to the subscriber. Instead, the subscriber may be identified by transmission of an IMSI number, stored on the SIM card. Many network and security features, however, are enabled by knowing the current device being used by a subscriber.

An Internet Protocol (IP) address is a numerical identification and logical address that is assigned to devices participating in a computer network utilizing the Internet Protocol for communication between its nodes. Although IP addresses are stored as binary numbers, they are usually displayed in human-readable notations, such as 208.77.188.166 (for IPv4), and 2001:db8:0:1234:0:567:1:1 (for IPv6). The triple role of the IP address has been characterized as: 1) endpoint identifier—a means of uniquely identifying a device interface that is attached to a network; 2) location identifier—a means of identifying where a device is located within a network; and 3) forwarding identifier—a lookup key into a forwarding table to make local switching decisions. Using IP, each device on a network is assigned a unique address so it can communicate across the Internet. Generally, communication is accomplished by sending "packets" of information that include the IP address of the destination device.

For mobile devices using Internet Protocol, the approach to mobility in IPv4 has been to use two IP addresses to fully describe a mobile device. The mobile device uses a constant IP address, which may be considered as its identity. This identity IP address is passed to the local mobile base station, which then informs the mobile's home station of the mobile's identity address, as well as the address of the current mobile base station. Any packets that the home station wants to pass to the mobile device can be sent to the mobile base station, which in turn will pass them on. From this perspective, the address of the mobile base station can be thought of as the mobile device's current location, while its own IP address serves as an identity. In operation, a remote system sends a packet to the mobile device quite normally—that is, using the mobile device's IP address as both an identity and location identifier. Once the packet reaches the home base station the packet is encapsulated in an IP transport header, with the new destination IP address being that of the most recent mobile base station. In effect, the packet now uses a location IP address that is not the same as its identity IP address. At the mobile base station the outer IP transport header is stripped off and the original packet is passed directly to the mobile device.

A cookie is a data file that a Web server, e.g., using IP to communicate with a user device, can store, e.g., in a memory or disk drive, on a user's device. Generally, cookies allow a Web site to store information on a user's device and later retrieve it. The pieces of information in the data file typically are stored as name-value pairs. For example, a Web site might generate a unique identification number for each visitor to the Web site and store the identification number on each user's device—typically a computer—using a cookie file.

SUMMARY

According to one embodiment, a system includes a server computing device configured to communicate with a network-based device via a network; a visitor identification, in which the system generates the visitor identification and the visitor identification corresponds to a piece of information that is unique to the network-based device; a mapping for which the system adds the generated visitor identification to the mapping so that the visitor identification uniquely identifies the network-based device from all other network-based devices in communication with the server computing device; and a database in which the system tracks the visitor identification among a plurality of visitor identifications in the database.

According to another embodiment, a method includes: gathering at least one piece of uniquely identifying user device information from a network-based device; checking whether the uniquely identifying user device information is mapped to a visitor identification; authenticating the network-based device in response to determining that the uniquely identifying user device information is mapped to a specific visitor identification; and generating a new visitor identification and adding the new visitor identification to a mapping in response to determining that the uniquely identifying user device information is not mapped to a specific visitor identification.

According to another embodiment, a method includes: receiving uniquely identifying user device information transmitted from a network-based device in response to the use of an API call of a financial service provider on the network-based device; checking whether the uniquely identifying user device information is mapped to a visitor identification by searching a database based on the uniquely identifying user device information; authenticating the network-based device in response to determining that the uniquely identifying user device information is mapped to a specific visitor identification; and, in response to determining that the uniquely identifying user device information is not mapped to a specific visitor identification: generating a new visitor identification uniquely corresponding to the uniquely identifying user device information; and adding the new visitor identification to the mapping by storing the uniquely identifying user device information along with the generated visitor identification in the database.

These and other features and advantages of the present invention will be more readily apparent from the detailed description of the embodiments set forth below taken in conjunction with the accompanying drawings.

BRIEF DESCRIPTION OF THE FIGURES

FIG. 2 is a flowchart diagram illustrating a method in accordance with an embodiment of the present invention.

FIG. 3 is a database table illustrating a mapping transformation of data in accordance with an embodiment of the present invention.

Figure 1:
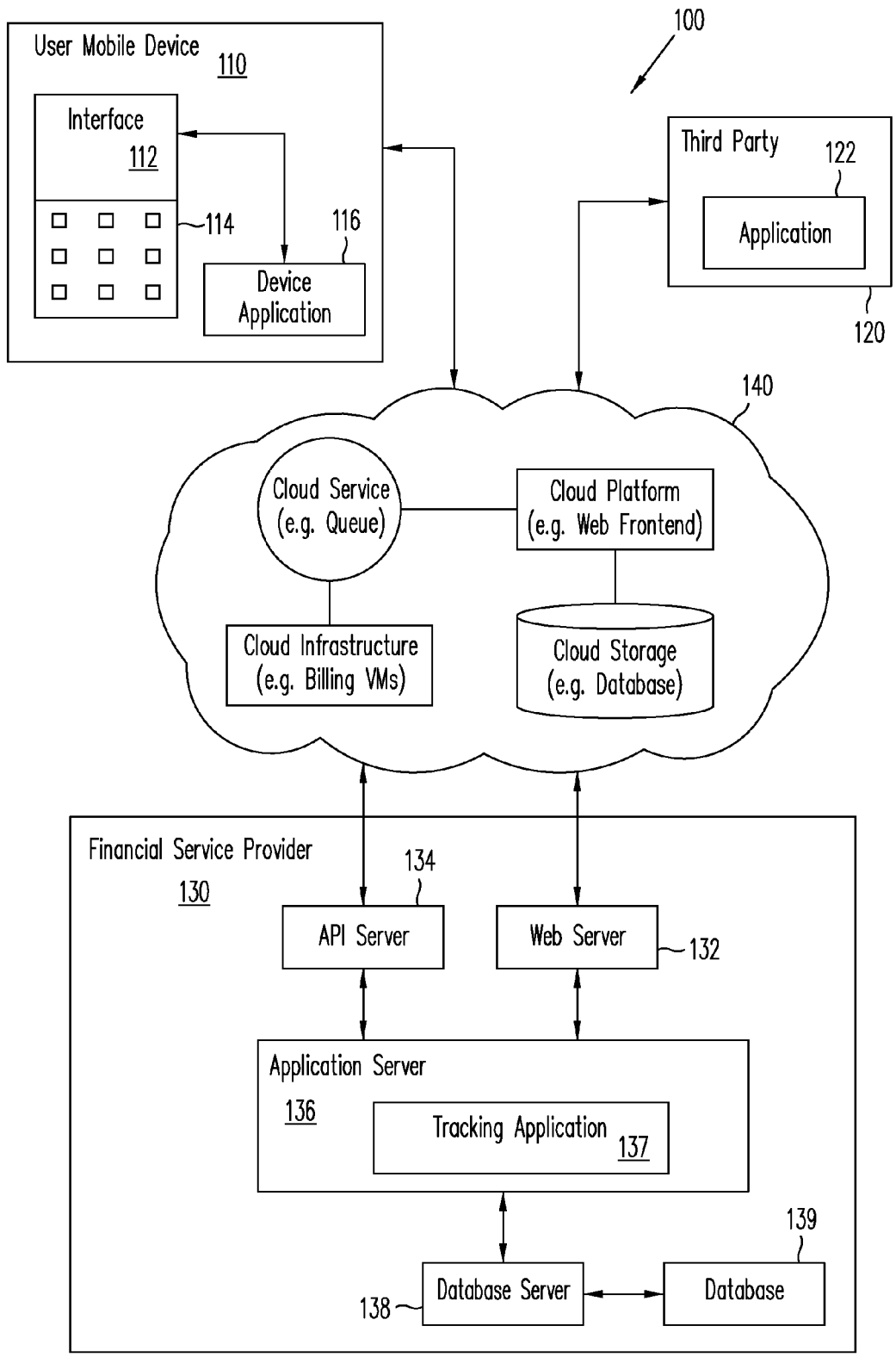
FIG. 1 is a system diagram illustrating a system in accordance with an embodiment of the present invention.

Exemplary embodiments and their advantages are best understood by referring to the detailed description that follows. It should be appreciated that like reference numerals are used to identify like elements illustrated in one or more of the figures, wherein showings therein are for purposes of illustrating exemplary embodiments and not for purposes of limiting the same.

DETAILED DESCRIPTION

Embodiments of the present disclosure relate to systems and methods for providing a means to track or authenticate a user's mobile device, e.g., mobile phone, by identifying the device and generating a visitor identification for the device in response to the use of an application programming interface (API) to a service provider's website so that the service provider can associate—via a mapping of a device identifier to the generated visitor identification—the visitor identification with the device on current and subsequent visits to the provider's website without the use of cookies.

Embodiments may be useful, for example, for a service provider in enabling mobile devices having a native API, e.g., an API not provided by the service provider, to be tracked or authenticated by the service provider, which would not be possible using conventional cookies.

Referring to FIG. 1, a system 100 is illustrated in accordance with one embodiment. System 100 may include a user mobile device 110 such as a mobile phone or other network based device by which a system user (also referred to as a "visitor", not shown in FIG. 1) may communicate with the system 100. System 100 may also include a third party 120, a financial service provider 130, and a communications network 140. Communication among the user of mobile phone 110, third party 120, and financial service provider 130 via communications network 140 may be provided, for example, by the use of various devices such as mobile phone 110, computers, web servers, routers, and cell phone networks—used by a visitor to whom the mobile phone 110 may belong, the third party 120, and the financial service provider 130.

For example, communications network 140 may include the Internet, email, a public or private telephone network, a private wireless network using technologies such as Bluetooth or IEEE 802.11x, or other networks, and may provide a capability for cloud computing, as indicated in FIG. 1. As shown in FIG. 1, any of third party 120, financial service provider 130, and the visitor via mobile phone 110 may avail themselves of the cloud computing capabilities of communications network 140. In addition, financial service provider 130 may employ a server computing device (e.g., a web server 132) in the sending, receiving, and transforming of information.

Communication among third party 120, financial service provider 130, and mobile phone 110 may involve, for example, web servers, web clients, browsers, and application programming interfaces (API) and may also make use of short messaging service (SMS) messaging and multimedia messaging service (MMS) messaging. The network-based device, e.g., mobile phone 110, may include a user interface or display 112 with a keyboard 114 allowing a user of the device to interact, for example, with a device application 116 hosted by the device. For example, the mobile phone 110, running device application 116, may host an API associated with the financial service provider 130. The network-based device—for example, mobile phone 110, a personal digital assistant (PDA), or iPhone®—used by the user may be browser-enabled and may engage in an interactive message or open communication session, such as SMS, email, wireless application protocol (WAP), web, interactive voice response (IVR), or other mobile interfaces. The interactive messaging or open communication session may involve multiple technology modalities, e.g. the user may engage the system 100 via SMS and receive a responsive communication from an IVR Server or as an SMS with an embedded hyperlinked URL (uniform resource locator) directing the user's device (e.g., mobile phone 110) to a WAP or web page. A hyperlinked URL may be delivered directly to the network-based device (e.g., mobile phone 110), for example, from an application server (e.g., API server 134) of the financial service provider 130 and may be used to access a web site or a micro-browser, such as a WAP site.

Financial service provider 130 may also execute a tracking application 137 on an application server computing device 136 that is in communication with API server 134 and web server 132, as shown in FIG. 1. The application server 136 and tracking application 137 may be in communication with a database server 138 that provides access to a database 139.

Third party 120 may be, for example, a merchant such as a retailer or a provider of some service that a customer—such as a user of mobile phone 110—may wish to purchase. The third party 120 may provide a capability to pay for the goods or services through the financial provider 130, which may provide a means for the customer to pay the third party 120 without exposing selected financial information of the customer (e.g., a customer's credit card number) to the third party 120. Third party 120 may execute an application 122 on a computing device that is in communication with the financial service provider 130 and the mobile phone 110 of the customer via the communications network 140. Third party application 122 may, for example, automatically take orders, send invoices and order confirmations, receive payments, and track inventory for third party 120.

A customer (not shown) may also have an account (also referred to as the "service account") with the financial service provider 130. The customer's service account may provide a number of payment services and functions to the customer. For example, the customer's service account may allow the customer to accumulate value (e.g., in a commercial currency, such as the U.S. dollar, or a proprietary currency, such as "points") in accounts, and then later to redeem the accumulated value against a debt (e.g., for goods, services, or other payments) presented via an invoice or bill. The financial service provider 130 may also extend credit to the customer 115 via the service account, or may also have access to other funding sources to complete transactions, e.g. a credit card, a bank account, or a credit line. The financial service provider 130 may operate as a money transmitter or a bank, for example. The financial service provider 130 may keep certain specific, or selected, financial information of the customer secure with respect to the third party 120. For example, a payment from the customer may be received by the third party 120 via the financial service provider 130 exclusive of the payment method or financial information of the customer, including credit card information, bank information, or other service account information belonging to the customer.

Referring to FIG. 2, method 200 is illustrated in accordance with one embodiment. At step 202 of method 200, information included in a user device that uniquely identifies the user device, such as mobile phone 110, may be gathered from the user device, for example, when mobile phone 110 is used to contact financial service provider 130. The information may include, for example, one or more of a SIM (subscriber identity module) identification, IMEI (international mobile equipment identification) number, IP (internet protocol) identification (e.g., an IP address), or the phone number of the mobile phone 110. When a user (e.g., a customer of third party 120 having a service account with financial service provider 130) of mobile phone 110 uses an API call of the financial service provider 120 API running on mobile phone 110—for example, to pay for a purchase using the services provided by financial service provider 120—the device information may be transmitted to the financial service provider 120 via communications network 140. Use of the financial service provider 120 API enables mobile devices (e.g., mobile phone 110) with native APIs to be tracked or authenticated, which would not be possible using conventional cookies.

At step 204, financial service provider 120 may check whether the user device information so gathered (which may include one or more of, for example, SIM identification, IMEI, IP address, and phone number, or other identifying information) has been mapped to a visitor identification that has already been generated by the financial service provider 120 and stored in system 100. For example, the uniquely identifying user device information may be received by web server 132 or API server 134 and passed on to application server 136 where tracking application 137, running on application server 136, may perform a search of database 139 for any of the uniquely identifying user device information.

The uniquely identifying user device information may have been stored, in response to a previous transmission of the uniquely identifying user device information, in database 139 in the form of a table such as mapping table 300 shown in FIG. 3, for example. The information shown in table 300 is for purposes of illustration only ("xxxx" represents presence of data and a blank in the table represents a possible lack of data) and the information may also be stored in other forms, such as a tree or a hash table, that may be used to expedite searching. If the uniquely identifying user device information is not found after searching the table 300, method 200 continues at step 210; and if a match to any of the uniquely identifying user device information is found in table 300, method 200 continues at step 220.

At step 210, if there is no mapped visitor identification (such as on an initial use of mobile phone 110 with service provider 130), the financial service provider 130 may generate a visitor identification based on the device information and store it for future use. For example, if the uniquely identifying user device information has not been found after searching the table 300, a new visitor identification may be generated that uniquely corresponds to the uniquely identifying user device information and, therefore, uniquely corresponds to the user device, e.g., mobile phone 110, itself. The new visitor identification may be generated based on the uniquely identifying user device information, for example, by selecting a specific piece of the information—such as the IMEI number—to serve as the visitor identification or, in another example, by applying a mathematical function of some kind to a combination of the uniquely identifying user device information—such as hashing the SIM ID and MAC (media access control) address and concatenating a serial number to provide a unique hash result. In another example, the new visitor identification may be generated as a serial number, for example, by adding 1 to the previously generated visitor identification. Also for example, any scheme that generates a new visitor identification that is distinct from all previous visitor identifications may be used to generate a new visitor identification that uniquely corresponds to the network-based device from which the uniquely identifying user device information has been gathered at step 204. Financial service provider 130 may use tracking application 137, for example, to generate a new visitor identification that uniquely identifies the network-based device from which the uniquely identifying user device information has been gathered at step 204.

At step 212, the new visitor identification may be added to a mapping that provides a correspondence between network-based devices—such as mobile phone 110—and visitor identifications. For example, the uniquely identifying user device information gathered at step 204 may be stored in system 100 (e.g., tracking application 137 may request database server 138 to store the data in database 139) and mapped against the generated visitor identification by storing the uniquely identifying user device information along with the generated visitor identification in a row of a database table such as table 300 shown in FIG. 3. Thus, table 300 may embody a mapping of device information against visitor identifications, but the mapping may also be represented and calculated in other forms. For example, the table 300 may indexed or other structures such as binary trees may be used to increase the efficiency of searching or calculating whether a piece of uniquely identifying device information is entered in the table and whether a visitor identification corresponds to it and what the corresponding visitor identification is. Method 200 may continue from step 212 at step 222.

At step 220, if there is a mapped visitor identification (such as on a subsequent use of mobile phone 110 with service provider 130), the network-based device may be authenticated by the financial service provider 130 based on information previously stored, e.g., in database 139. For example, if the uniquely identifying user device information has been found after searching the table 300, the mapped visitor identification may be calculated or found from the table 300. As seen in FIG. 3, for example, visitor identification "VID k" may be determined based on a SIM ID and phone number that appear in table 300. In other words, the uniquely corresponding visitor identification may be determined based on a match to any of the uniquely identifying user device information is found in table 300.

Because the visitor identification uniquely corresponds to the uniquely identifying user device information and, therefore, uniquely corresponds to the user device, e.g., mobile phone 110, itself, the mobile phone 110 may be authenticated, e.g., uniquely identified by financial service provider 130. Financial service provider 130 may use tracking application 137, for example, to search the table 300 and to either authenticate or not authenticate the network-based device in question. Once authenticated, tracking application 137 may provide for further processing of information related to the network-based device, e.g., mobile phone 110. For example, method 200 may branch to step 222 or step 224.

At step 222, the authenticated device, (e.g., mobile phone 110) may be internally tracked. For example, data related to a current phone call may stored by financial service provider 130 using tracking application 137 to access database 139 via database server 138. Data to be stored for tracking purposes may include, for example, purchase information related to third party 120, such as the identity of third party 120, items ordered, amount of payment, means of payment between the user of mobile phone 110 and the financial service provider 130, and means of payment between the financial servicer provider 130 and third party 120. The tracking data may be stored in a database table related to table 300 with the tracking data keyed to the visitor identification, in table 300, that belongs to mobile phone 110.

At step 224, the financial service provider 130 may interact with the user of mobile phone 110 based on tracking data retrieved from the database 139 using the unique visitor identification of mobile phone 110 as a key to find the tracking data in database 139. For example, tracking application 137 may automatically provide the user of mobile phone 110 with recommendations for additional purchases from third party 120 or automatically provide the user with customer service account information, such as credit limit and available credit, corresponding to the authenticated visitor identification.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as processing component (e.g., processor, micro-controller, digital signal processor (DSP), etc.), system memory component (e.g., RAM), static storage component (e.g., ROM), disk drive component (e.g., magnetic or optical), network interface component (e.g., modem or Ethernet card), display component (e.g., CRT or LCD), input component (e.g., keyboard or keypad), and/or cursor control component (e.g., mouse or trackball). In one embodiment, disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Logic may be encoded in a computer readable medium, which may refer to any medium that participates in providing instructions to the processor for execution. Such a medium may take many forms, including but not limited to, non-volatile media, volatile media, and transmission media. In various implementations, non-volatile media includes optical or magnetic disks, such as disk drive component, volatile media includes dynamic memory, such as system memory component, and transmission media includes coaxial cables, copper wire, and fiber optics, including wires that comprise bus. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted.

In various embodiments, execution of instruction sequences for practicing the invention may be performed by a computer system. In various other embodiments, a plurality of computer systems coupled by communication link (e.g., LAN, WLAN, PTSN, or various other wired or wireless networks) may perform instruction sequences to practice the invention in coordination with one another.

Computer system may transmit and receive messages, data, information and instructions, including one or more programs (i.e., application code) through communication link and communication interface. Received program code may be executed by processor as received and/or stored in disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A system comprising:
   a server computing device configured to communicate with a network-based device via a network;
   a visitor identification, wherein:
      the system generates the visitor identification; and
      the visitor identification corresponds to a piece of information that is unique to the network-based device;
   a mapping table, wherein:
      the system generates a mapping for which the visitor identification uniquely identifies the network-based device by, in response to determining that the uniquely identifying user device information is not mapped to a specific visitor identification, adding the generated visitor identification to the mapping table so that the visitor identification serves as a database key for tracking the network-based device by uniquely identifying the network-based device from all other network-based devices in communication with the server computing device; and
   a database, wherein:
      the system tracks the visitor identification among a plurality of visitor identifications in the database including:
   storing a tracking data in the database so that the tracking data is keyed to the visitor identification, wherein the tracking data includes a purchase information for purchases made with the network-based device;
   retrieving the tracking data for the network-based device, using the mapping for which the visitor identification uniquely identifies the network-based device and using the visitor identification as a key to find the tracking data; and
   interacting with a user of the network-based device including providing a purchase recommendation based on the purchase information included in the retrieved tracking data.

2. The system of claim 1, further comprising:
   a web server configured to send and receive information between the network and the server computing device.

3. The system of claim 1, further comprising:
   an application programming interface (API) associated with a financial service provider.

4. The system of claim 3, wherein:
   the information unique to the network-based device is transmitted to the server computing device in response to use of an API call.

5. The system of claim 1, wherein:
   the server computing device is an application server; and
   the application server executes a tracking application.

6. The system of claim 1, further comprising:
   a database server that provides the server computing device access to the database.

7. The system of claim 1, wherein:
   the visitor identification is generated so that the visitor identification is distinct from each of a plurality of visitor identifications stored in the system.

8. The system of claim 1, wherein:
the visitor identification is generated based on the information that is unique to the network-based device.

9. The system of claim 1, wherein:
the visitor identification is generated so that the visitor identification uniquely corresponds to the information that is unique to the network-based device.

10. The system of claim 1, wherein:
the visitor identification is generated so that the visitor identification uniquely corresponds to the network-based device.

11. A method comprising:
   gathering at least one piece of uniquely identifying user device information from a network-based device, wherein the uniquely identifying user device information is transmitted from the network-based device in response to the use of an application programming interface (API) call of a financial service provider on the network-based device;
   checking whether the uniquely identifying user device information is mapped to a visitor identification by searching a database to determine whether the uniquely identifying user device information is already included in a mapping table;
   authenticating the network-based device in response to determining that the uniquely identifying user device information is already included in the mapping table and mapped to a specific visitor identification;
   generating a mapping for which the visitor identification uniquely identifies the network-based device by, in response to determining that the uniquely identifying user device information is not mapped to a specific visitor identification, generating a new visitor identification and adding the new visitor identification to the mapping, wherein:
      the new visitor identification uniquely corresponds to the uniquely identifying user device information; and
      the new visitor identification is added to the mapping by storing the uniquely identifying user device information along with the new visitor identification in the database;
   storing a tracking data in the database so that the tracking data is keyed to the visitor identification, wherein the tracking data includes a purchase information for purchases made with the network-based device;
   retrieving the tracking data for the network-based device, using the mapping for which the visitor identification uniquely identifies the network-based device and using the visitor identification as a key to find the tracking data; and
   interacting with a user of the network-based device including providing a purchase recommendation based on the purchase information included in the retrieved tracking data.

12. The method of claim 11, further comprising:
tracking the authenticated network-based device.

13. The method of claim 11, further comprising:
interacting with a user based on data retrieved from the database using the specific visitor identification as a key.

14. The method of claim 11, wherein:
checking whether the uniquely identifying user device information is mapped to a visitor identification comprises searching a database table for a match to any of the uniquely identifying user device information.

15. The method of claim 11, wherein:
authenticating the network-based device comprises determining a mapped visitor identification from the database in response to finding a match to any of the uniquely identifying user device information.

16. The method of claim 11, wherein:
generating the new visitor identification comprises generating the visitor identification based on the uniquely identifying user device information.

17. The method of claim 11, wherein:
adding the new visitor identification to the mapping comprises storing the uniquely identifying user device information along with the generated visitor identification in a row of a database table.

18. The method of claim 12, wherein:
tracking the authenticated network-based device comprises retrieving information from the database using the specific visitor identification as a key.

19. A computer program product comprising a non-transitory computer readable medium having computer readable and executable code for instructing a processor to perform a method, the method comprising:
  receiving uniquely identifying user device information transmitted from a network-based device in response to the use of an API call of a financial service provider on the network-based device;
  checking whether the uniquely identifying user device information is mapped to a visitor identification by searching a database to determine whether the uniquely identifying user device information is already included in a mapping table;
  authenticating the network-based device in response to determining that the uniquely identifying user device information is already included in the mapping table and mapped to a specific visitor identification;
  generating a mapping for which the visitor identification uniquely identifies the network-based device by, in response to determining that the uniquely identifying user device information is not mapped to a specific visitor identification, generating a new visitor identification and adding the new visitor identification to the mapping, wherein:
    the new visitor identification uniquely corresponds to the uniquely identifying user device information; and
    the new visitor identification is added to the mapping by storing the uniquely identifying user device information along with the new visitor identification in the database,
  storing a tracking data in the database so that the tracking data is keyed to the visitor identification, wherein the tracking data includes a purchase information for purchases made with the network-based device;
  retrieving the tracking data for the network-based device, using the mapping for which the visitor identification uniquely identifies the network-based device and using the visitor identification as a key to find the tracking data; and
  interacting with a user of the network-based device including providing a purchase recommendation based on the purchase information included in the retrieved tracking data.

* * * * *